US012652080B2

(12) United States Patent
Jung et al.

(10) Patent No.: US 12,652,080 B2
(45) Date of Patent: Jun. 9, 2026

(54) METHOD AND DEVICE FOR REPORTING CHANNEL STATE INFORMATION IN WIRELESS COMMUNICATION SYSTEM SUPPORTING RECONFIGURABLE INTELLIGENT SURFACE

(71) Applicant: Samsung Electronics Co., Ltd., Gyeonggi-do (KR)

(72) Inventors: Geonwoong Jung, Gyeonggi-do (KR); Seunghyun Lee, Gyeonggi-do (KR); Juho Lee, Gyeonggi-do (KR); Jungsoo Jung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 280 days.

(21) Appl. No.: 18/495,176

(22) Filed: Oct. 26, 2023

(65) Prior Publication Data

US 2024/0146358 A1     May 2, 2024

(30) Foreign Application Priority Data

Oct. 26, 2022     (KR) ......................... 10-2022-0139618

(51) Int. Cl.
| | |
|---|---|
| *H04B 7/04* | (2017.01) |
| *H04B 7/06* | (2006.01) |
| *H04B 17/318* | (2015.01) |

(52) U.S. Cl.
CPC ....... *H04B 7/04013* (2023.05); *H04B 7/0617* (2013.01); *H04B 7/0626* (2013.01); *H04B 17/328* (2023.05)

(58) Field of Classification Search
CPC .............. H04B 7/04013; H04B 17/328; H04B 7/0617; H04B 7/0626

USPC .......................................................... 370/329
See application file for complete search history.

(56) References Cited

U.S. PATENT DOCUMENTS

| | | | | |
|---|---|---|---|---|
| 9,698,951 | B2* | 7/2017 | Kim ...................... | H04L 5/0057 |
| 10,277,296 | B2* | 4/2019 | Zhang .................. | H04B 7/0626 |
| 2015/0016379 | A1 | 1/2015 | Nam et al. | |
| 2015/0162966 | A1 | 6/2015 | Kim et al. | |
| 2016/0050648 | A1 | 2/2016 | Seo et al. | |
| 2019/0052333 | A1* | 2/2019 | Xu ........................ | H04L 5/0048 |
| 2019/0327632 | A1 | 10/2019 | Kim et al. | |

(Continued)

FOREIGN PATENT DOCUMENTS

| | | |
|---|---|---|
| KR | 10-2013-0097117 | 9/2013 |
| KR | 10-2015-0035555 | 4/2015 |

(Continued)

*Primary Examiner* — Anthony Mejia
(74) *Attorney, Agent, or Firm* — The Farrell Law Firm, P.C.

(57) ABSTRACT

The disclosure relates to a method and device for a channel state information (CSI) report including beam information in a wireless communication system supporting an RIS. A method performed by a BS in a wireless communication system supporting an RIS includes configuring a CSI-RS group based on at least one of an RIS reflection pattern to be applied to an RIS device or a transmission beam of the BS, transmitting, to a UE, configuration information for a CSI report related to a transmission beam for the BS to transmit a CSI-RS to the UE based on the configured CSI-RS group, and receiving a CSI report related to the transmission beam from the UE receiving the CSI-RS for each CSI-RS group.

18 Claims, 13 Drawing Sheets

(56)                   References Cited

U.S. PATENT DOCUMENTS

| | | | |
|---|---|---|---|
| 2021/0306045 A1 | 9/2021 | Cha et al. | |
| 2022/0239358 A1 | 7/2022 | Kim et al. | |
| 2022/0377730 A1 * | 11/2022 | Yang | H04W 52/36 |
| 2023/0078537 A1 * | 3/2023 | Yerramalli | H04B 7/0639 |
| | | | 370/329 |
| 2023/0118008 A1 * | 4/2023 | Kim | H04L 5/0053 |
| | | | 370/329 |
| 2023/0308140 A1 * | 9/2023 | Baligh | H04B 7/04013 |
| 2024/0088954 A1 * | 3/2024 | Athley | H04B 7/0469 |
| 2024/0163859 A1 * | 5/2024 | Lee | H04L 5/001 |
| 2024/0322882 A1 * | 9/2024 | Rom | H04L 5/0057 |

FOREIGN PATENT DOCUMENTS

| | | | | |
|---|---|---|---|---|
| KR | 10-2016-0011182 | 1/2016 | | |
| KR | 10-2022-0050936 | 4/2022 | | |
| WO | WO 2018/128384 | 7/2018 | | |
| WO | WO-2022169333 A1 * | 8/2022 | | H04B 7/0626 |
| WO | WO-2022197064 A1 * | 9/2022 | | H04W 72/542 |
| WO | WO-2022240102 A1 * | 11/2022 | | H04L 5/0051 |

* cited by examiner (a)         (b)

METHOD AND DEVICE FOR REPORTING CHANNEL STATE INFORMATION IN WIRELESS COMMUNICATION SYSTEM SUPPORTING RECONFIGURABLE INTELLIGENT SURFACE

CROSS-REFERENCE TO RELATED APPLICATION(S)

This application is based on and claims priority under 35 U.S.C. § 119 to Korean Patent Application No. 10-2022-0139618, which was filed in the Korean Intellectual Property Office on Oct. 26, 2022, the entire content of which is incorporated herein by reference.

BACKGROUND

1. Field

The disclosure relates generally to a wireless communication system, and more particularly, to a communication method and device using reconfigurable intelligent surface (RIS) technology in a wireless communication system.

2. Description of Related Art

Wireless communication technologies have been developed mainly for human services, such as voice, multimedia, and data communication. As 5th-generation (5G) communication systems are commercially available, connected devices are expected to explosively increase and to be connected to a communication network. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In the 6th-generation (6G) era, efforts are being made to develop an enhanced 6G communication system to provide various services by connecting hundreds of billions of devices and things. For this reason, the 6G communication system is called a beyond 5G system.

In the 6G communication system expected to be realized around year 2030, the maximum transmission rate is tera (i.e., 1000 gigabit) bps, and the wireless latency is 100 microseconds (pec). In other words, the transmission rate of the 6G communication system is 50 times faster than that of the 5G communication system, and the wireless latency is reduced to one tenth.

To achieve these high data rates and ultra-low latency, 6G communication systems are considered to be implemented in terahertz bands (e.g., 95 gigahertz (95 GHz) to 3 terahertz (3 THz) bands). As the path loss and atmospheric absorption issues worsen in the terahertz band as compared with millimeter wave (mmWave) introduced in 5G, technology that may guarantee signal reach, that is, coverage, would become more important. As major techniques for ensuring coverage, there need to be developed multi-antenna transmission techniques, such as new waveform, beamforming, massive multiple-input and multiple-output (MIMO), full dimensional MIMO (FD-MIMO), array antennas, or large-scale antennas, which exhibit better coverage characteristics than radio frequency (RF) devices and orthogonal frequency division multiplexing (OFDM). New technologies, such as a metamaterial-based lens and antennas, high-dimensional spatial multiplexing technology using an orbital angular momentum (OAM), and an RIS, are being discussed to enhance the coverage of the terahertz band signals.

For 6G communication systems to enhance frequency efficiency and system network for 6G communication systems include full-duplex technology, there are being developed full-duplex technology in which uplink and downlink simultaneously utilize the same frequency resource at the same time, network technology that comprehensively use satellite and high-altitude platform stations (HAPSs), network architecture innovation technology that enables optimization and automation of network operation and supports mobile base stations (BSs), dynamic spectrum sharing technology through collision avoidance based on prediction of spectrum usages, artificial intelligence (AI)-based communication technology that uses AI from the stage of designing and internalizes end-to-end AI supporting function to thereby optimize the system, and next-generation distributed computing technology that realizes services that exceed the limitation of the UE computation capability by ultra-high performance communication and mobile edge computing (MEC) or clouds. Further, continuous attempts have been made to reinforce connectivity between device, further optimizing the network, prompting implementation of network entities in software, and increase the openness of wireless communication by the design of a new protocol to be used in 6G communication systems, implementation of a hardware-based security environment, development of a mechanism for safely using data, and development of technology for maintaining privacy.

Such research and development efforts for 6G communication systems would implement the next hyper-connected experience via hyper-connectivity of 6G communication systems which encompass human-thing connections as well as thing-to-thing connections. Specifically, the 6G communication system would be able to provide services, such as truly immersive extended reality (XR), high-fidelity mobile hologram, and digital replica. Further, services, such as remote surgery, industrial automation and emergency response would be provided through the 6G communication system thanks to enhanced security and reliability and would have various applications in medical, auto, or home appliance industries.

In the conventional art, cross-band wide-band reflections in an RIS-based communication environment often cause performance degradation in the wireless communication system. Accordingly, there is a need for a method for preventing performance deterioration due to cross-band broadband reflection.

SUMMARY

The disclosure has been made to address at least the above-mentioned problems and/or disadvantages and to provide at least the advantages described below.

Accordingly, an aspect of the disclosure is to provide a method and device for reporting channel state information (CSI) including beam information in a wireless communication system supporting an RIS.

An aspect of the disclosure is to provide a method and device for configuring a CSI-RS group for a CSI report including beam information in a wireless communication system supporting an RIS.

An aspect of the disclosure is to provide a method and device for transmitting/receiving a CSI report including beam information about at least one of a best transmission beam and a worst transmission beam of a BS in a wireless communication system supporting an RIS.

An aspect of the disclosure is to provide a method and device for optimal scheduling to reduce influence by an RIS in a cross-band using a CSI report including beam information in a wireless communication system supporting an RIS.

According to an embodiment, a method performed by a BS in a wireless communication system supporting an RIS includes configuring at least one CSI-reference signal (CSI-RS) group based on at least one of an RIS reflection pattern to be applied to an RIS device and a transmission beam of the BS, transmitting, to a user equipment (UE), configuration information for a CSI report related to at least one transmission beam for the BS to transmit a CSI-RS to the UE based on the configured CSI-RS group, and receiving a CSI report related to the at least one transmission beam from the UE receiving the CSI-RS for each CSI-RS group.

According to an embodiment, a BS in a wireless communication system supporting an RIS comprises a transceiver and a processor configured to configure at least one CSI-RS group based on at least one of an RIS reflection pattern to be applied to an RIS device and a transmission beam of the BS, transmit, through the transceiver to a UE, configuration information for a CSI report related to at least one transmission beam for the BS to transmit a CSI-RS to the UE based on the configured CSI-RS group, and receive, through the transceiver, a CSI report related to the at least one transmission beam from the UE receiving the CSI-RS for each CSI-RS group.

According to an embodiment, a method performed by a UE in a wireless communication system supporting an RIS comprises receiving, from a BS, configuration information for a CSI report related to at least one transmission beam for the BS to transmit, to the UE, CSI-RSs of each CSI-RS group, receiving the CSI-RSs from the BS and measuring a received signal strength, and transmitting, to the BS, a CSI report including beam information related to the at least one transmission beam based on the configuration information and the received signal strength.

According to an embodiment, a UE in a wireless communication system supporting an RIS comprises a transceiver and a processor configured to receive, from a BS through the transceiver, configuration information for a CSI report related to at least one transmission beam for the BS to transmit, to the UE, CSI-RSs of each CSI-RS group, receive the CSI-RSs from the BS and measure a received signal strength, and transmit, through the transceiver to the BS, a CSI report including beam information related to the at least one transmission beam based on the configuration information and the received signal strength.

BRIEF DESCRIPTION OF THE DRAWINGS

The foregoing and other aspects, features, and advantages of certain embodiments of the present disclosure will become more apparent from the following description with reference to the accompanying drawings, in which.

DETAILED DESCRIPTION

Figure 1:
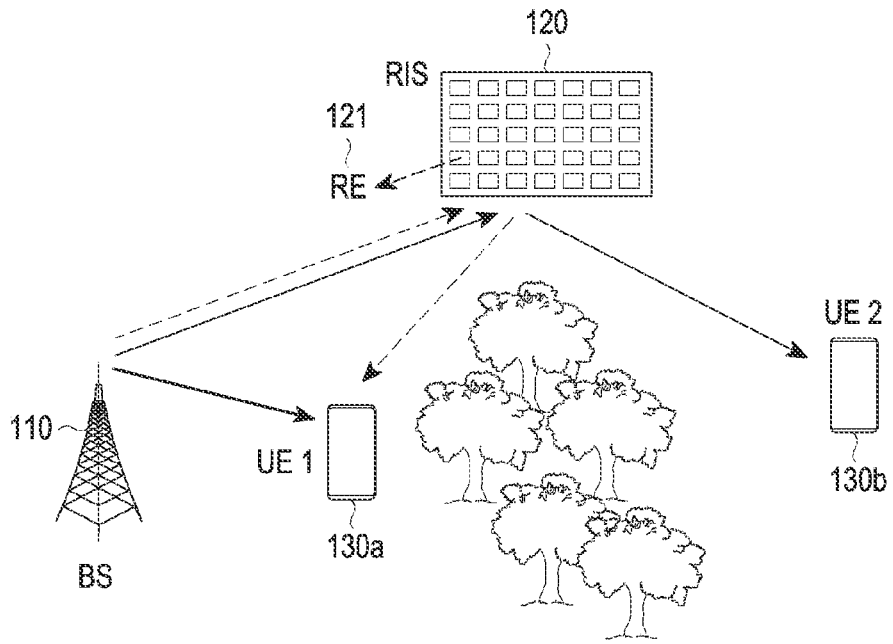
FIG. 1 illustrates an example wireless communication system supporting an RIS to which the disclosure is applied.

Hereinafter, various embodiments of the disclosure is described below with reference to the accompanying drawings. Descriptions of well-known functions and constructions may be omitted for the sake of clarity and conciseness.

Terms as used herein are defined considering the functions in the disclosure and may be replaced with other terms according to the intention or practice of the user or operator. Therefore, the terms should be defined based on the overall disclosure.

Advantages and features of the disclosure, and methods for achieving the same may be understood through the embodiments to be described below taken in conjunction with the accompanying drawings. However, the disclosure is not limited to the embodiments disclosed herein, and various changes may be made thereto. The embodiments disclosed herein are provided only to inform one of ordinary skilled in the art of aspects of the disclosure. The same reference numeral denotes the same element throughout the specification.

The components included in the disclosure are represented in singular or plural forms depending on specific embodiments proposed. However, the singular or plural forms are selected to be adequate for contexts suggested for ease of description, and the disclosure is not limited thereto. As used herein, the singular forms "a," "an," and "the" are intended to include the plural forms as well, unless the context clearly indicates otherwise.

As used herein, the term "unit" indicates a software element or a hardware element such as a field-programmable gate array (FPGA) or an application specific integrated circuit (ASIC). A unit plays a certain role. However, a unit is not limited to software or hardware and may be configured in a storage medium that may be addressed or may be configured to execute one or more processors. Accordingly, as an example, a unit includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. Functions provided within the components and the units may be combined into fewer components and units or further separated into additional components and units. The components and units may be implemented to execute one or more CPUs in a device or secure multimedia card. According to embodiments, a " . . . unit" may include one or more processors.

As used herein, each of such phrases as "A/B," "A or B," "A and/or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another and does not limit the components in other aspect (e.g., importance or order).

As used herein, terms for identifying access nodes, denoting network entities, messages, inter-network entity interfaces, and various pieces of identification information are provided as an example for ease of description. Thus, the disclosure is not limited to the terms, and the terms may be replaced with other terms denoting objects with equivalent technical meanings.

In the disclosure, a BS is a network entity allocating resources to the UE and capable of communicating with the UE and may be at least one of an eNode B, a Node B, a gNB, a radio access network (RAN), an access network (AN), a RAN node, an integrated access/backhaul (IAB) node, a radio access unit, a BS controller, a node over network, or a transmission reception point (TRP). A UE may be at least one of a terminal, a mobile station (RIS), cellular phone, smartphone, computer, or multimedia system capable of performing communication functions.

In a wireless communication system such as a general long term evolution (LTE) system or a 5G system, a BS may transmit a CSI-RS, which is a UE-specific reference signal, and the UE may measure the strength of a received signal of the CSI-RS and transmit CSI to the BS. The CSI may include at least one of a channel quality indicator (CQI), a precoding matrix indicator (PMI), and a rank indication (RI) associated with the channel state in downlink.

RIS technology is being studied as one of the next generation communication technologies. In RIS technology, a reflection pattern of multiple reflecting elements (REs) included in the RIS device is formed as a combination of phase and/or amplitude, and the transmission beam of the BS incident on the RIS device may be reflected in a desired direction according to the reflection pattern. If the RIS device is used, it is possible to transfer the transmission beam of the BS, incident on the RIS device, to the UE by reflecting the transmission beam when the UE is located in the shadow area where the transmission beam cannot reach. If the RIS device is used, it is possible to transfer the transmission beam of the UE, incident on the RIS device from the UE located in the shadow area, to the BS by reflecting the transmission beam.

FIG. 1 illustrates an example wireless communication system supporting an RIS to which the disclosure is applied.

The system of FIG. 1 assumes a communication environment in which the RIS device 120 is installed around the BS 110 and obstacles 140 such as buildings and forests forming shadow areas are present around the UEs 130a and 130b. In such a communication environment, the UE 130a located in a line of sight (LoS) from the BS 100 may receive a signal through a transmission beam in a direct path from the BS 100. However, the UE 130b located in the shadow area may not receive a signal in a direct path from the BS 100. The BS 110 may be connected to the RIS device 120 through a wired or wireless backhaul link and may provide control information to the RIS device 120. The RIS device 120 controlled by the BS 110 may form a reflection pattern of REs 121 as a combination of the reflection phase and/or the amplitude, and may reflect the transmission beam of the BS 110 incident on the RIS device 120 to the UE 130b in the shadow area according to the reflection pattern. The BS 110 may provide RIS beambook information (also referred to as RIS codebook information) to the RIS device 120 capable of reflecting the transmission beam of the BS 110 toward the shadow area through the backhaul link. The RIS beambook information may include phase shift matrices used by the RIS device 120 to generate reflection patterns for reflection of the transmission beam of the BS 110, and the phase shift matrix $\Phi_m$ corresponding to each reflection pattern may be selected from the RIS beambook information as shown below in Equation (1). The BS 110 may select a reflection pattern to be applied to the RIS device 120.

$$\text{RIS reflection pattern: } \Phi_m \in \Omega$$

$$\text{RIS beambook: } \Omega = \{\Phi_0, \Phi_1, \ldots, \Phi_{B-1}\} \quad (1)$$

Figure 2:
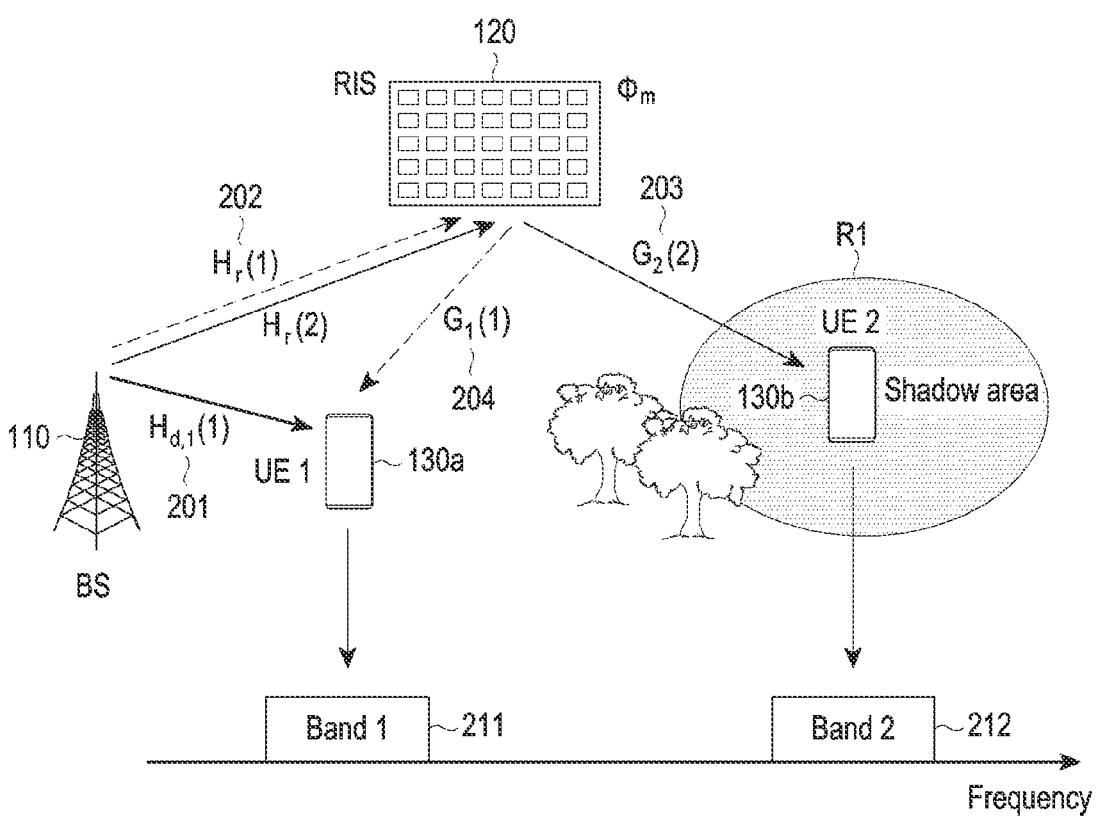
FIG. 2 illustrates an influence on performance due to different cross-band channels when a plurality of bands is used in a wireless communication system supporting an RIS to which the disclosure is applied.

FIG. 2 illustrates an influence on performance due to different cross-band channels when a plurality of bands is used in a wireless communication system supporting an RIS to which the disclosure is applied.

In FIG. 2, the RIS device 120 may be installed around the BS 110, and the RIS device 120 may reflect the transmission beam of the BS 210 incident on each RIS device toward the UE 130b in the shadow area R1 according to the reflection pattern $\Phi_m$ selected from the RIS beambook information. In FIG. 2, it is assumed that the UE 130a uses a first band (Band 1) 211 and the UE 130b uses a second band (Band 2) 212. The downlink channel of the UE 130a using the first band 211 may be expressed as shown below in Equation (2) and the downlink channel of the UE 130b using the second band 212 may be expressed as shown below in Equation (3).

$$H_{d,1}(1) + G_1(1)\Phi_m H_r(1) \quad (2)$$

$$G_2(2)\Phi_m H_r(2) \quad (3)$$

In Equation (2), $H_{d,1}(1)$ 201 denotes the channel (i.e., BS-UE channel) of the direct path between the BS 110 and the UE 130a, $H_r(1)$ 202 denotes the channel (i.e. BS-RIS channel) between the BS 110 and the RIS device 120, $G_1(1)$ 204 is the channel (i.e., RIS-UE channel) of the reflection path between the RIS device 120 and UE 130a, and $\Phi_m$ denotes the reflection pattern.

In Equation (3), $H_r(2)$ denotes the channel (i.e., BS-RIS channel) between the BS 110 and the RIS device 120, and $G_2(2)$ 204 denotes the channel (i.e., RIS-UE channel) of the reflection path between the RIS device 120 and the UE 130*b*.

In FIG. 2, the RIS device 120 may well reflect the downlink signal of the BS 110 transmitted to the UE 130*b* using the second band 212 in the shadow area R1 to increase the received signal strength in the UE 130*b*. However, due to the broadband reflection characteristic ($\Phi_m$) in the RIS device 120, the UE 130*b* using the first band 211 may experience performance degradation due to, e.g., the channel of $G_1(1)\Phi_m H_r(1)$ in Equation (2) in a cross-band (or cross-carrier). Therefore, considering the broadband reflection characteristics of the RIS device 120, it is necessary not only to enhance transmission performance for a specific UE (in the case of the example of FIG. 2, the UE 130*b*), but also to enhance the overall performance in the network by optimizing the reflection pattern in the cross-band (or cross-carrier).

Figure 3:
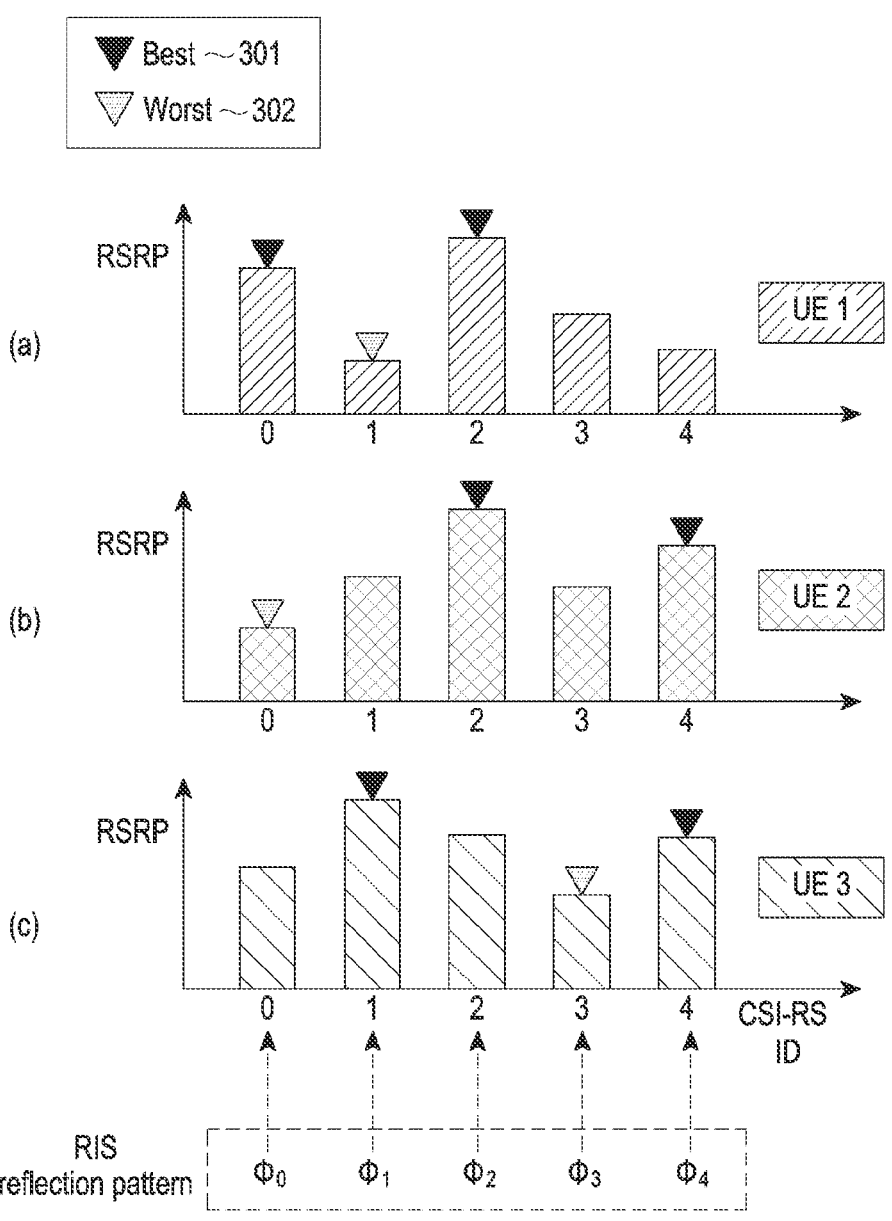
FIG. 3 illustrates an example reception signal strength for each RIS reflection pattern of each UE in a communication environment in which a plurality of UEs use a plurality of bands in a wireless communication system supporting an RIS to which the disclosure is applied.

FIG. 3 illustrates an example reception signal strength for each RIS reflection pattern of each UE in a communication environment in which a plurality of UEs use a plurality of bands in a wireless communication system supporting an RIS to which the disclosure is applied. In FIG. 3, it is assumed that UE1 and UE2 use a first band Band1 and UE3 uses Band 2 to perform communication.

Graphs (a), (b), and (c) of FIG. 3, respectively, show examples of reference signal received power (RSRP) in UE1, UE2, and UE3 when the reflection patterns $\Phi_0$ to $\Phi_4$ are used in the RIS device. In graphs (a), (b), and (c) of FIG. 3, "0" to "4" on the horizontal axis each denote the identifier (ID) of the CSI-RS which is the reference signal reflected through each reflection pattern of the RIS device and received by the UE. Reference numeral 301 indicates the best transmission beam(s) of the BS having a good (relatively high) RSRP in UE1, UE2, and UE3, and reference numeral 302 indicates the worst transmission beam(s) of the BS having a poor (relatively low) RSRP in UE1, UE2, and UE3.

In the present disclosure, for example, that the signal strength of a first signal (e.g., a first RSRP) is relatively greater than the signal strength of a second signal (e.g., a second RSRP) may mean that the first RSRP>the second RSRP. Alternatively, stating that the state of the first RSRP is good may mean that the first RSRP is greater than a preset reference value. Alternatively, stating that the state of the second RSRP is poor may mean that the second RSRP is less than a preset reference value.

Referring to graph (a), UE1 receives a signal having a good RSRP in the reflection patterns $\Phi_0$ and $\Phi_2$ and receives a signal having a poor RSRP in the reflection pattern $\Phi_1$. Referring to graph (b), UE2 receives a signal having a good RSRP in the reflection patterns $\Phi_2$ and $\Phi_4$ and receives a signal having a poor RSRP in the reflection pattern $\Phi_0$. Referring to graph (c), UE3 receives a signal having a good RSRP in the reflection patterns $\Phi_1$ and $\Phi_4$ and receives a signal having a poor RSRP in the reflection pattern $\Phi_3$.

Figure 4A:
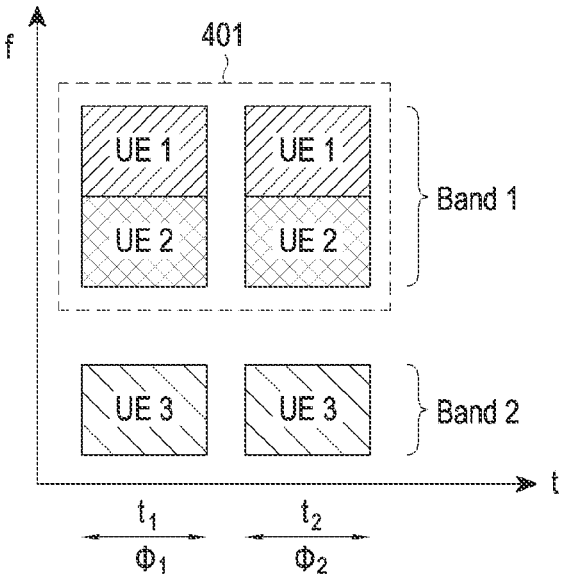
FIG. 4A illustrates performance deterioration due to cross-band wide-band reflections in the RIS-based communication environment of FIG. 3.

FIG. 4A illustrates performance deterioration due to cross-band wide-band reflections in the RIS-based communication environment of FIG. 3 to which the disclosure is applied.

In FIG. 3, if the BS receives, from each UE, information (e.g., the index of the corresponding transmission beam) about two best transmission beams having the highest RSRP for the reflection patterns $\Phi_0$ to $\Phi_4$, the BS applies the reflection patterns corresponding to the two best transmission beams for each slot (which indicates a slot in the third generation partnership project (3GPP) new radio (NR) standard) when scheduling for downlink transmission to the UE. When the BS applies the reflection pattern $\Phi_1$ to UE1 and UE2 using Band 1 and UE3 using Band 2 at time t1 and applies the reflection pattern $\Phi_2$ at time t2 through scheduling as shown in reference numeral 401 of FIG. 4A, performance deterioration occurs due to influence by cross-band (or cross-carrier) broadband reflection in UE1 due to application of the reflection pattern at time t1. It is noted that in graph (a) in FIG. 3, the RSRP of UE1 is poor when the reflection pattern $\Phi_1$ is applied.

Figure 4B:
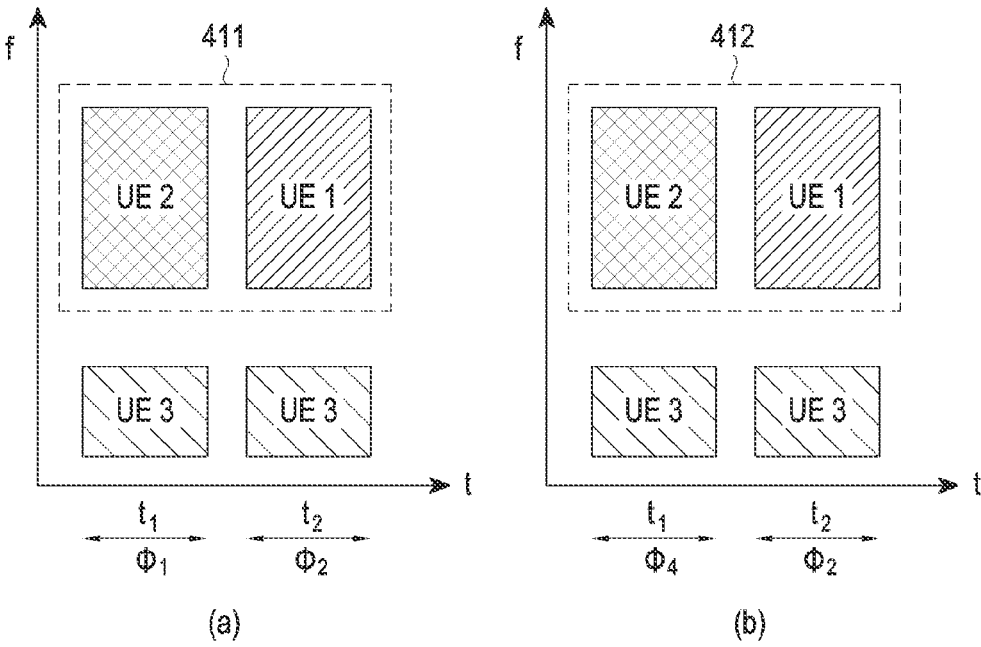
FIG. 4B illustrates a method for preventing performance deterioration due to cross-band wide-band reflections in an RIS-based communication environment according to an embodiment.

FIG. 4B illustrates a method for preventing performance deterioration due to cross-band wide-band reflections in an RIS-based communication environment according to an embodiment.

In FIG. 4B, the BS may receive, from each UE, information (e.g., the index of the corresponding transmission beam) about at least one of, e.g., at least a best transmission beam having the highest RSRP and at least a worst transmission beam having the lowest RSRP for the reflection patterns $\Phi_0$ to $\Phi_4$ in the communication environment as shown in FIG. 3.

Graph (a) of FIG. 4B illustrates a downlink scheduling scheme of a BS when the BS receives, e.g., information about a best transmission beam having the highest RSRP strength and information about a worst transmission beam having the lowest RSRP strength from a UE. FIG. 4B(b) illustrates, e.g., a downlink scheduling scheme of a BS when the BS receives, from the UE, information about two best transmission beams and information about a worst transmission beam having the lowest RSRP strength, e.g., in the order from the highest RSRP strength.

If the reflection pattern $\Phi_0$ is applied to UE2 using the first band and UE3 using the second band at time $t_1$ and the reflection pattern $\Phi_2$ is applied to UE1 and UE3 at time $t_2$ through scheduling as shown at 411 in graph (a) of FIG. 4B, the reflection pattern $\Phi_1$ is not applied to UE1 at time $t_1$, so that performance deterioration in UE1 due to other cross-band broadband reflections may be prevented as in FIG. 3. If the reflection pattern $\Phi_4$ having a relatively good RSRP is applied to UE2 using the first band and UE3 using the second band at time $t_1$, and the reflection pattern $\Phi_2$ having a relatively good RSRP is applied to UE1 and UE3 at time $t_2$ through scheduling as shown at 412 in graph (b) of FIG. 4B, influence by cross-band broadband reflections may be prevented.

In FIG. 4B, in a communication environment using an RIS device having a broadband reflection characteristic, optimal scheduling capable of preventing an influence by cross-band broadband reflections may be performed. To that end, the BS may receive a CSI report including information (e.g., the index of the corresponding transmission beam) about at least one of a best transmission beam having the highest RSRP and a worst transmission beam having the lowest RSRP from each UE. The CSI may include information about the best transmission beam and/or the worst transmission beam except for CQI, PMI, and RI. Alternatively, the CSI may include at least one of CQI, PMI, and RI, and information about the best transmission beam and/or the worst transmission beam. Herein, it is possible to prevent performance deterioration due to destructive interference between channels caused by cross-band broadband reflections by including information about at least a worst transmission beam in the CSI report from the UE as described above.

The UE may measure the CSI-RS received through each transmission beam of the BS to identify the RSRP of each transmission beam. The BS may divide CSI-RSs for receiving the report of the best transmission beam and/or the worst transmission beam into at least one group (hereinafter, a "CSI-RS group") and configure resources for the CSI-RS group(s).

Configuration information and/or control information for the BS to receive a report of the best transmission beam and/or the worst transmission beam from the UE(s) may be provided to the UE(s) through higher layer signaling and/or L1 signaling.

Higher layer signaling may correspond to at least one of a master information block (MIB), system information block (SIB) or SIB X (X=1, 2, . . . ), radio resource control (RRC), or a medium access control (MAC) control element (CE).

L1 signaling may correspond to at least one physical layer channel or signaling method including a physical downlink control channel (PDCCH), downlink control information (DCI), UE-specific DCI, group common DCI, common DCI, scheduling DCI (e.g., DCI used for scheduling downlink or uplink data), and non-scheduling DCI (e.g., DCI not for the purpose of scheduling downlink or uplink data).

Figure 5A:
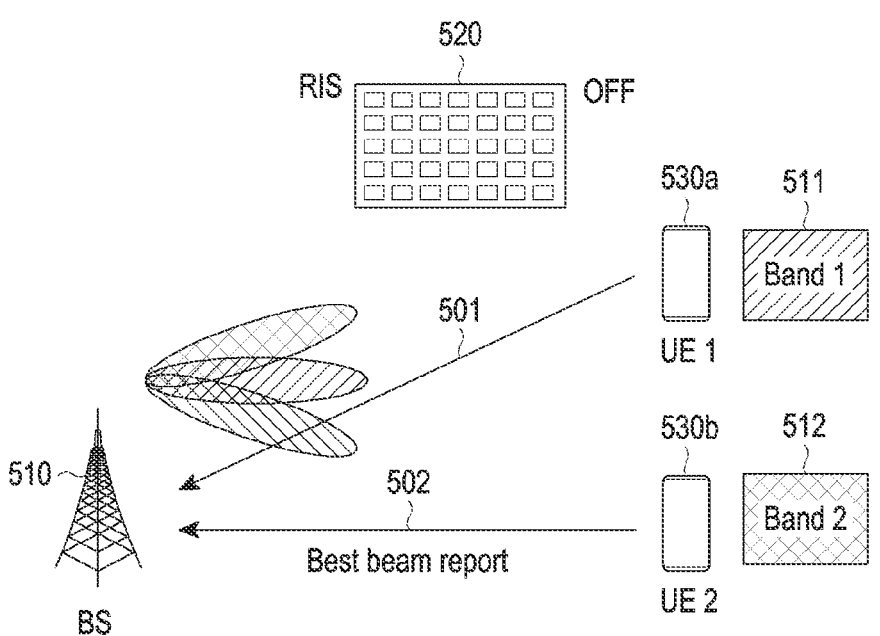
FIG. 5A illustrates a CSI reporting method for each CSI-RS group in a wireless communication system supporting an RIS according to an embodiment.
Figure 5B:
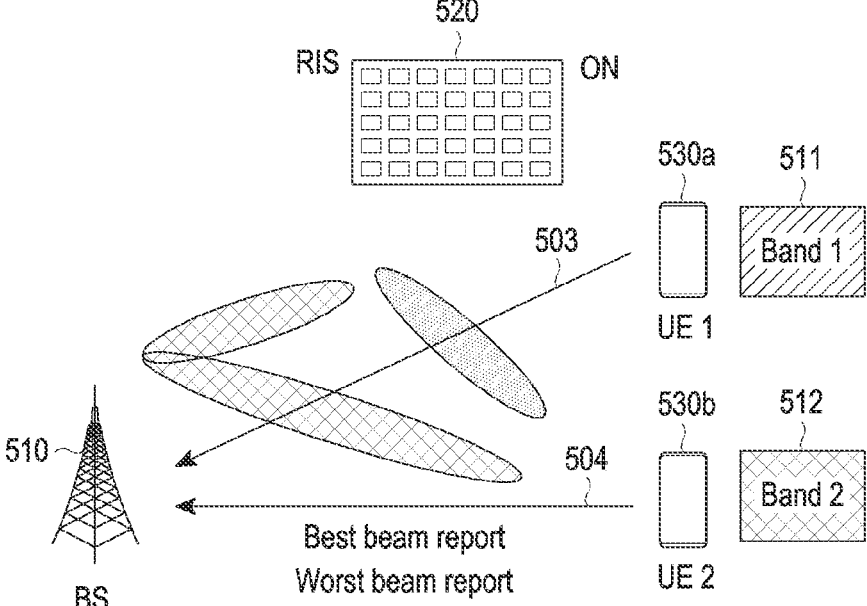
FIG. 5B illustrates a CSI reporting method for each CSI-RS group in a wireless communication system supporting an RIS according to an embodiment.

FIG. 5A illustrates a CSI reporting method for each CSI-RS group in a wireless communication system supporting an RIS according to an embodiment. FIG. 5B illustrates a CSI reporting method for each CSI-RS group in a wireless communication system supporting an RIS according to an embodiment.

In the system of FIGS. 5A and 5B, the RIS device 520 is installed around the BS 510 and is selectively controlled to operate in the on or off state according to the control information of the BS 510. In the on state, the RIS device 520 may reflect the transmission beam of the BS 510 incident on the RIS device 520 to the UEs 530a and 530b according to the reflection pattern selected from the RIS beambook information, as described with reference to FIG. 2. The RIS device 520 does not reflect the transmission beam of the BS 510 in the off state. In FIGS. 5A and 5B, it is assumed that the UE 530a uses the first band 511 and the UE 530b uses the second band 512. For convenience, shadow areas are omitted from the illustration in FIGS. 5A and 5B. The two frequency bands 511, 512 are illustrated as being used by UEs, but the disclosure may be applied in the same manner even when more bands are used.

The BS may configure at least one CSI-RS group for receiving a CSI report including information about the best transmission beam and/or the worst transmission beam.

In FIG. 5A, the BS 510 may configure first CSI-RSs for the UEs 530a and 530b to report, to the BS 510, the first CSI including information about at least one best transmission beam (e.g., index information about the corresponding best transmission beam) as a first CSI-RS group (e.g., "group 0"). The BS 510 allocates resources of the first CSI-RSs belonging to the first CSI-RS group to the UEs 530a and 530b, and the UEs 530a and 530b receiving the first CSI-RSs perform RSRP measurement on the corresponding CSI-RS resource(s) and transmit, to the BS 510, the first CSI including information about at least one best transmission beam of the BS 510 transmitting the corresponding CSI-RS(s) (501 and 502). In the first CSI reporting operation for the first CSI-RS group, the RIS device 520 may be controlled in the off state.

In FIG. 5B, the BS 510 may configure second CSI-RSs for the UEs 530a and 530b to report, to the BS 510, the second CSI including index information about at least one best transmission beam and at least one worst transmission beam as a second CSI-RS group (e.g., "group 2"). The BS 510 allocates resources of the second CSI-RSs belonging to the second CSI-RS group to the UEs 530a and 530b, and the UEs 530a and 530b receiving the second CSI-RSs perform RSRP measurement on the corresponding CSI-RS resource(s) and transmit, to the BS 510, the second CSI including information about at least one best transmission beam and at least one worst transmission beam of the BS 510 transmitting the corresponding CSI-RS(s) (503 and 504). In the second CSI reporting operation for the second CSI-RS group, the RIS device 520 may be controlled in the on state.

The first and second CSI-RS groups may be distinguished only by the BS 510, and provision of configuration information indicating the first and second CSI-RS groups to the UEs 530a and 530b may be omitted.

In other words, the BS may distinguish each CSI-RS group, and the UE does not need to distinguish each CSI-RS group itself. The BS may provide each UE with configuration information about the CSI-RS resource(s) for CSI reporting and how many best/worst transmission beams for CSI reporting in each CSI-RS group are to be reported as CSI (e.g., the configuration information may include a configuration on how many best beams and/or how many worst beams are to be reported for CSI-RS resource(s) allocated to the UE among each CSI-RS group).

Since the RIS device 520 is turned off in the first CSI-RS group ("group 0"), the first CSI report considers the influence of the transmission beam of the BS 510 except for the influence of the cross-band broadband reflection by the RIS device 520 in each band. Since the RIS device 520 is turned on in the second CSI-RS group ("group 1"), the second CSI report considers the influence of the transmission beam of the BS 510 in each band as well as the influence of the cross-band broadband reflection due to the reflection operation of the RIS device 520.

Figure 6:
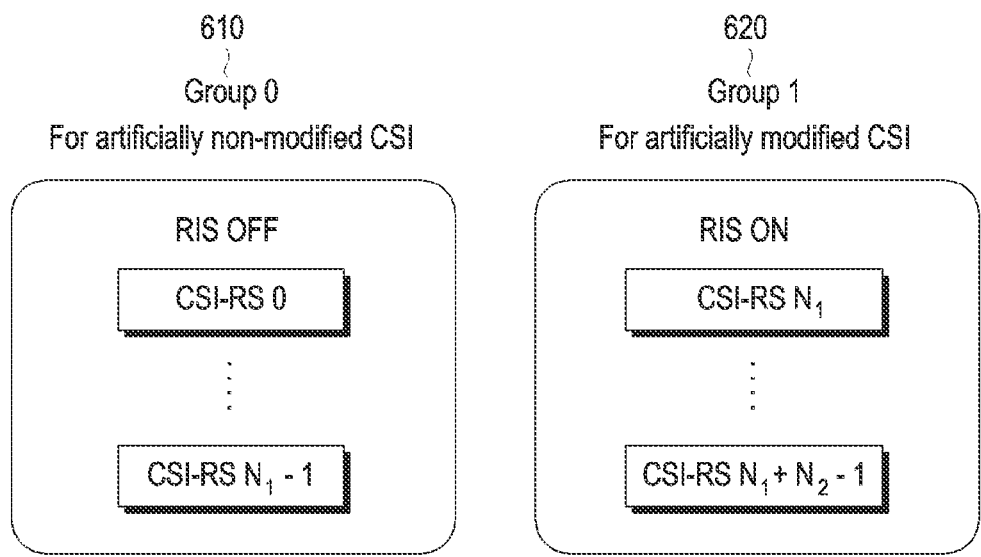
FIG. 6 illustrates a method for configuring a CSI-RS group in a wireless communication system supporting an RIS according to an embodiment.

FIG. 6 illustrates a method for configuring a CSI-RS group in a wireless communication system supporting an RIS according to an embodiment.

Referring to FIG. 6, for CSI-RS groups, first CSI-RSs (CSI-RS 0, . . . , CSI-RS $N_1$–1) for reporting a first CSI (i.e., an artificially non-modified CSI) which does not consider influence of the cross-band broadband reflections due to the reflection characteristics of the RIS device may be configured as a first CSI-RS group ("group 0") 610, and second CSI-RSs (CSI-RS $N_1$, . . . , CSI-RS $N_1$+$N_2$–1) for reporting a second CSI (i.e., an artificially modified CSI) considering influence of the cross-band broadband reflections due to the reflection characteristics of the RIS device may be configured as a second CSI-RS group ("group 1") 620. The BS may provide CSI-RS resource information corresponding to the first and second CSI-RS groups to the UE(s).

In FIG. 6, the CSI-RS groups are divided into two groups, but one or more CSI-RS groups may be configured.

Figure 7:
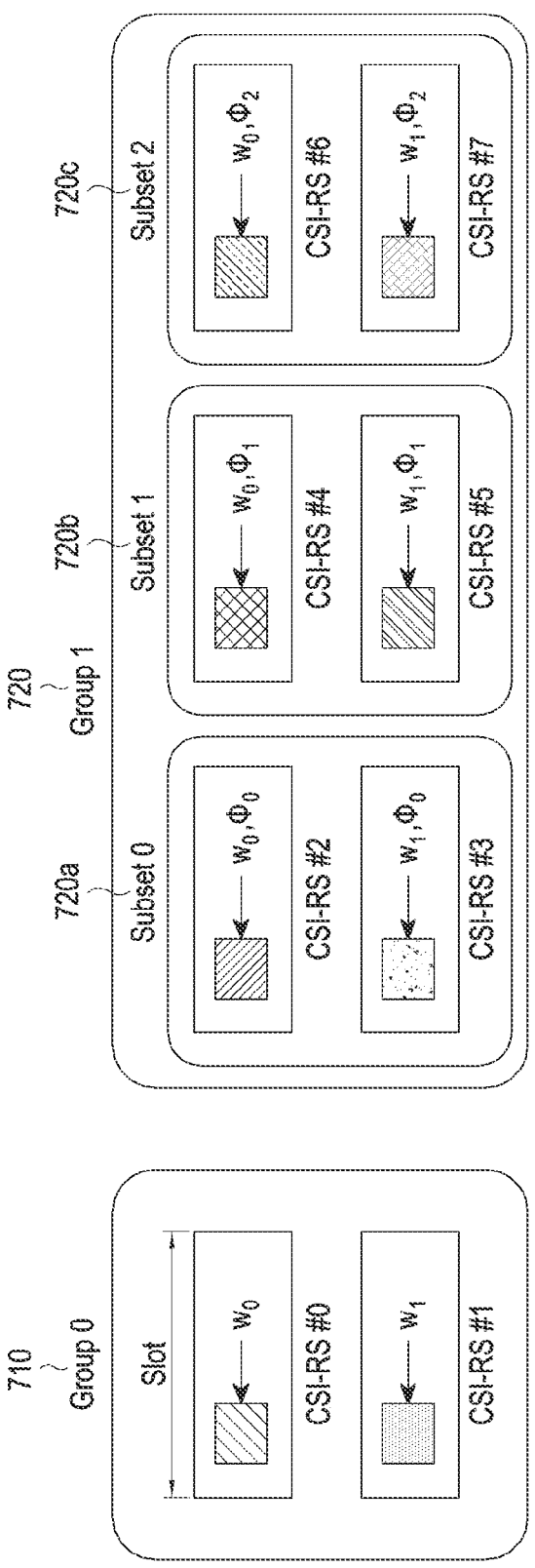
FIG. 7 illustrates a method for configuring resources of a CSI-RS group in a wireless communication system supporting an RIS according to an embodiment.

FIG. 7 illustrates a method for configuring resources of a CSI-RS group in a wireless communication system supporting an RIS according to an embodiment. Hereinafter, different shadings in FIGS. 7 to 11 may represent CSI-RSs having different "#number", different CSI-RS subsets or different CSI-RS groups for convenience.

In FIG. 7, CSI-RS #0 to CSI-RS #7 is a plurality of CSI-RSs configurable by the BS, $w_o$ and $w_1$ are the beamforming vectors of different transmission beams of the BS, and $\Phi_0$, $\Phi_1$, and $\Phi_2$ are different RIS reflection patterns applicable to the RIS device under the control of the BS. The BS may transmit the CSI-RS to the UE through a transmission beam in a direct path to the UE or a reflection path via the RIS device through various combinations of the beamforming vectors and the RIS reflection patterns.

For example, the BS may configure a first CSI-RS group ("group 0") 710 including first CSI-RSs (CSI-RS #0 and CSI-RS #1) for reporting a first CSI not considering influence of the cross-band broadband reflections and a second CSI-RS group ("group 1") 720 including second CSI-RSs (CSI-RS #2 to CSI-RS #7) for reporting a second CSI considering influence of the cross-band broadband reflection. When the first CSI-RSs CSI-RS #0 and CSI-RS #1 in the first CSI-RS group 710 are transmitted, the RIS device is controlled to be turned off by the BS. When the second CSI-RSs CSI-RS #2 to CSI-RS #7 in the second CSI-RS group 720 are transmitted, the RIS device is controlled to be turned on by the BS.

In FIG. 7, the first CSI-RSs CSI-RS #0 and CSI-RS #1 of the first CSI-RS group 710 are transmitted by applying only a beamforming vector, and the second CSI-RSs CSI-RS #2 to CSI-RS #7 of the second CSI-RS group 720 are transmitted by applying a combination of a beamforming vector and an RIS reflection pattern. The second CSI-RS group 720 includes a plurality of CSI-RS subsets (subset 0, subset 1, and subset 2) 720*a*, 720*b*, and 720*c*. For example, the same RIS reflection pattern may be applied to CSI-RSs in each CSI-RS subset of the plurality of CSI-RS subsets 720*a*, 720*b*, and 720*c*, and different RIS reflection patterns may be applied between different CSI-RS subsets. Different or identical beamforming vectors may be applied between CSI-RSs in the same CSI-RS subset. Three CSI-RS subsets 720*a*, 720*b*, and 720*c* are illustrated in FIG. 7 for convenience, but the second CSI-RS group 720 may include two or more CSI-RS subsets.

The BS may configure some CSI-RS subset(s) in the second CSI-RS group 720 for each UE. The BS may not provide information for distinguishing the CSI-RS groups and/or the CSI-RS subsets themselves to the UE but may provide resource information about CSI-RSs configured to the UE to the UE through the above-described higher layer signaling.

Figure 8:
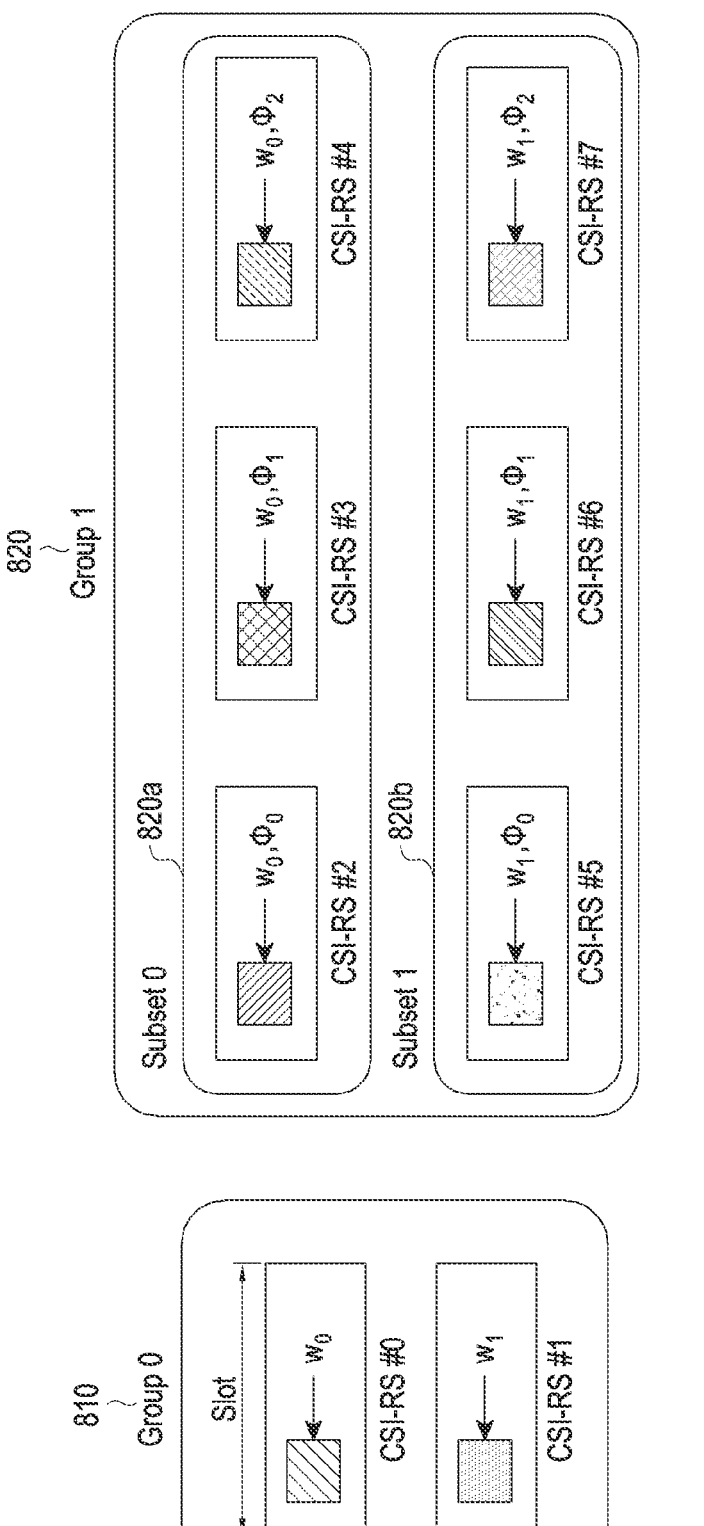
FIG. 8 illustrates a method for configuring resources of a CSI-RS group in a wireless communication system supporting an RIS according to an embodiment.

FIG. 8 illustrates a method for configuring resources of a CSI-RS group in a wireless communication system supporting an RIS according to an embodiment.

In FIG. 8, CSI-RS #0 to CSI-RS #7 is a plurality of CSI-RSs configurable by the BS, $w_o$ and $w_1$ are the beamforming vectors of different transmission beams of the BS, and $\Phi_0$, $\Phi_1$, and $\Phi_2$ are different RIS reflection patterns applicable to the RIS device under the control of the BS. The BS may transmit the CSI-RS to the UE through a transmission beam in a direct path to the UE or a reflection path via the RIS device through various combinations of the beamforming vectors and the RIS reflection patterns.

For example, the BS may configure a first CSI-RS group ("group 0") 810 including first CSI-RSs (CSI-RS #0 and CSI-RS #1) for reporting a first CSI not considering influence of the cross-band broadband reflections and a second CSI-RS group ("group 1") 820 including second CSI-RSs (CSI-RS #2 to CSI-RS #7) for reporting a second CSI considering influence of the cross-band broadband reflection. When the first CSI-RSs CSI-RS #0 and CSI-RS #1 in the first CSI-RS group 810 are transmitted, the RIS device is controlled to be turned off by the BS. When the second CSI-RSs CSI-RS #2 to CSI-RS #7 in the second CSI-RS group 820 are transmitted, the RIS device is controlled to be turned on by the BS.

In FIG. 8, the first CSI-RSs CSI-RS #0 and CSI-RS #1 of the first CSI-RS group 810 are transmitted by applying only a beamforming vector, and the second CSI-RSs CSI-RS #2 to CSI-RS #7 of the second CSI-RS group 820 are transmitted by applying a combination of a beamforming vector and an RIS reflection pattern. In FIG. 8, the second CSI-RS group 820 includes a plurality of CSI-RS subsets (subset 0 and subset 1) 820*a* and 820*b*. For example, the same beamforming vector may be applied to CSI-RSs in each CSI-RS subset of the plurality of CSI-RS subsets 820*a* and 820*b*, and different beamforming vectors may be applied between different CSI-RS subsets. Different or identical RIS reflection patterns may be applied between CSI-RSs in the same CSI-RS subset. In FIG. 8, two CSI-RS subsets 820*a* and 820*b* are illustrated for convenience, but the second CSI-RS group 820 may include two or more CSI-RS subsets.

The BS may configure some CSI-RS subset(s) in the second CSI-RS group 820 for each UE. The BS may not provide information for distinguishing the CSI-RS groups and/or the CSI-RS subsets themselves to the UE but may provide resource information about CSI-RSs configured to the UE to the UE through the above-described higher layer signaling.

Figure 9:
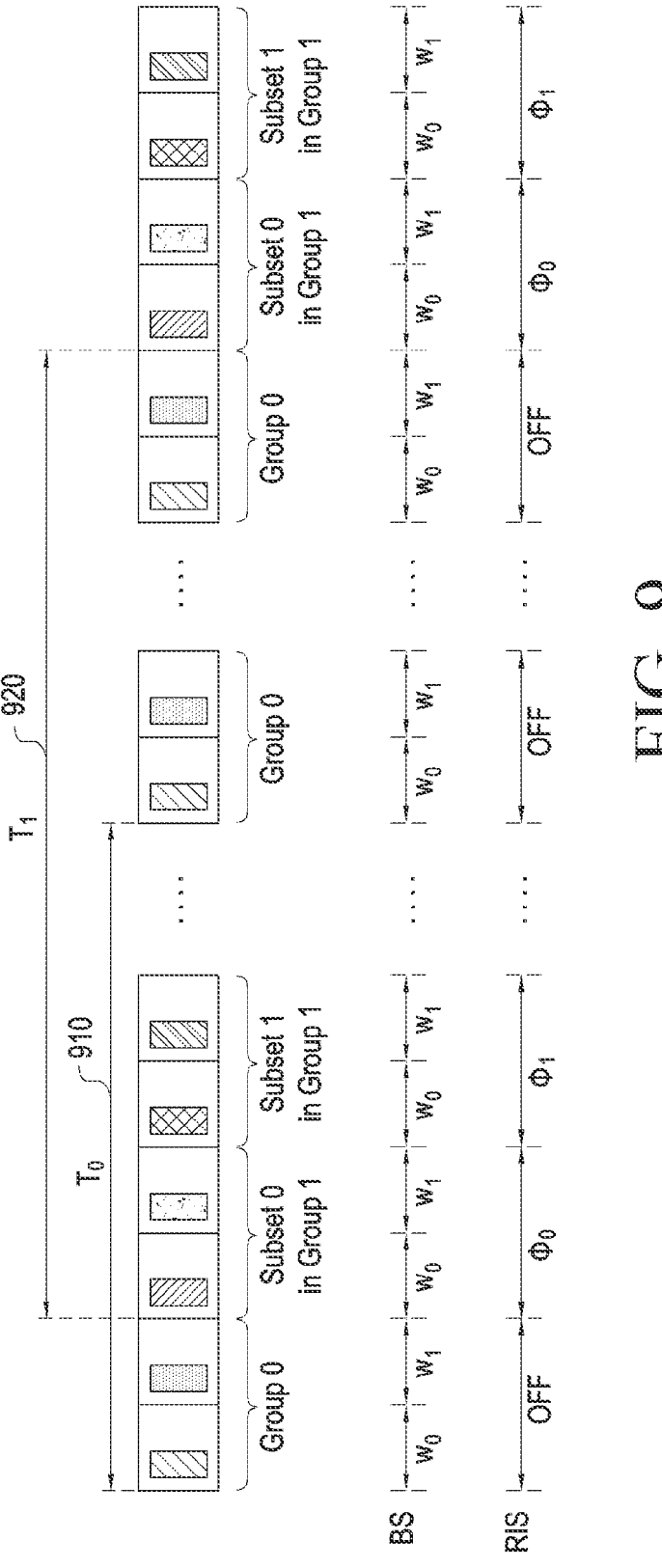
FIG. 9 illustrates a method for configuring a CSI-RS transmission period for each CSI-RS group in a wireless communication system supporting an RIS according to an embodiment.

FIG. 9 illustrates a method for configuring a CSI-RS transmission period for each CSI-RS group in a wireless communication system supporting an RIS according to an embodiment.

In FIG. 9, the BS may configure the first CSI-RS group 710 or 810 and the second CSI-RS group 720 or 820, as in FIG. 7 or 8. In FIG. 9, $w_o$ and $w_1$ denote the beamforming vectors of the transmission beams of the BS applied to each CSI-RS group (or subset), "Off" denotes that in the corresponding section, the RIS device is controlled to be turned off by the BS, and "$\Phi_0$" or "$\Phi_1$" denotes the RIS reflection pattern applied to the RIS device under the control of the BS in the corresponding section.

In FIG. 9, the BS may set a different CSI-RS transmission period for each CSI-RS group ("group 0" and "group 1"). For example, the first CSI-RS group ("group 0") may set a first transmission period ($T_0$) 910 for the first CSI-RS group ("group 0") and set a second transmission period ($T_1$) 920 for the second CSI-RS group ("group 1"). For example, in order to reduce the signaling overhead between the BS and the RIS device, when the switching period of the RIS reflection pattern is long, the second transmission period ($T_1$) 920 may be set to a relatively longer period than the first transmission period ($T_0$) 910. The first transmission period (T0) 910 and the second transmission period (T1) 920 may be set in slot units as in the 5G system, or may be set in various units, such as symbol/subframe/frame units. The configuration information about the CSI-RS transmission period for each CSI-RS group may be provided by the BS to the UE through higher layer signaling.

In the present disclosure, stating that a first period is relatively longer than a second period may mean that the first period>the second period. Alternatively, stating that a first period is long may mean that the first period is longer than a preset reference period. Alternatively, stating that the second period is short may mean that the second period is shorter than a preset reference period.

Figure 10:
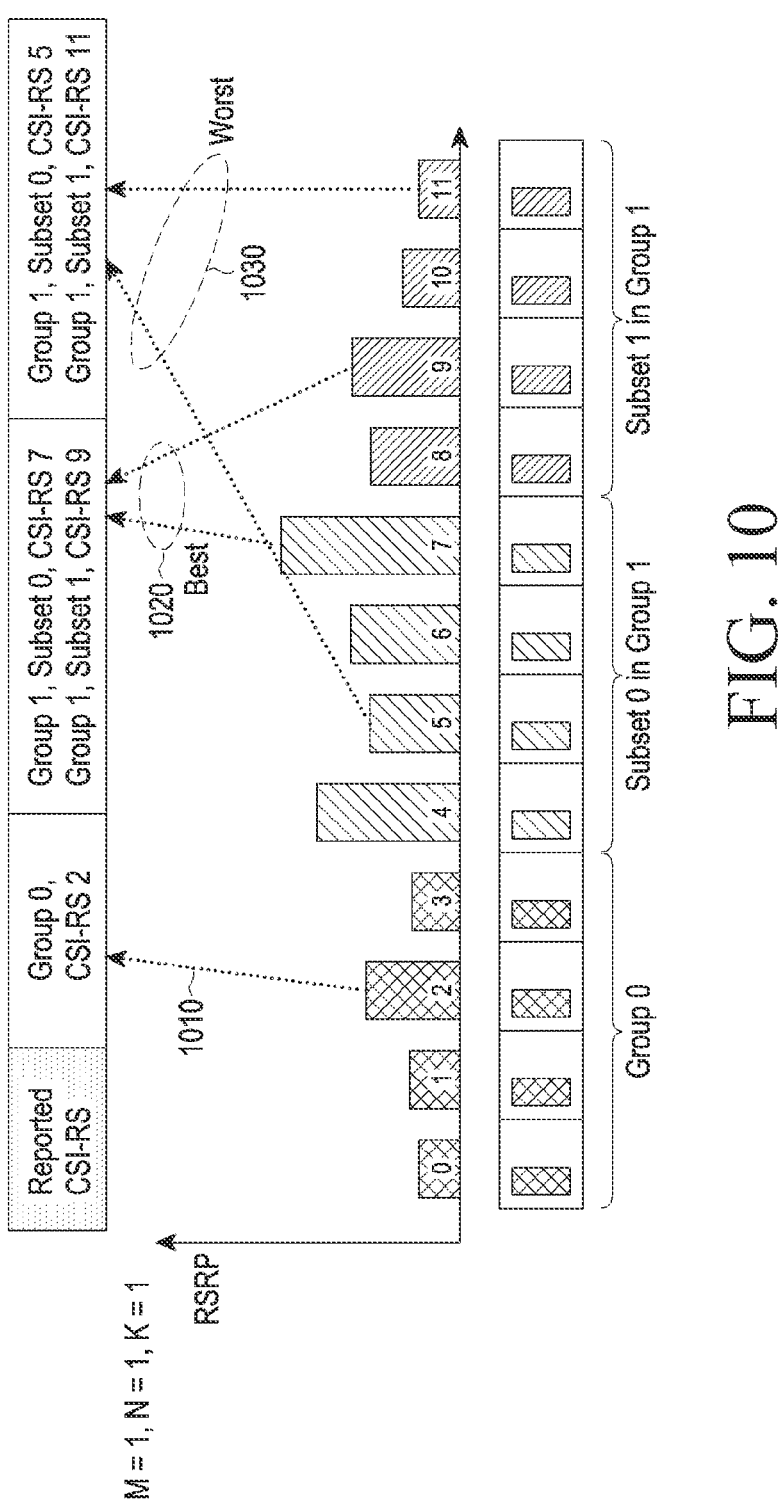
FIG. 10 illustrates a method for a CSI report of a CSI-RS group in a wireless communication system supporting an RIS according to an embodiment.

FIG. 10 illustrates a method for a CSI report of a CSI-RS group in a wireless communication system supporting an RIS according to an embodiment. FIG. 10 illustrates a configuration method for CSI reporting for each CSI-RS subset in a CSI-RS group.

In FIG. 10, the BS may configure a first CSI-RS group ("group 0") including first CSI-RS s (CSI-RS #0 to CSI-RS #3) for reporting the above-described first CSI and a second CSI-RS group ("group 1") including second CSI-RSs (CSI-RS #4 to CSI-RS #11) for reporting the above-described second CSI. In FIG. 10, it is assumed that the second CSI-RS group ("group 1") includes a first CSI-RS subset ("subset 0") including CSI-RS #4 to CSI-RS #7 and a second CSI-RS subset ("subset 1") including CSI-RS #8 to CSI-RS #11.

If the BS configures the first CSI report for M CSI-RS(s) having a relatively large RSRP in the first CSI-RS group ("group 0") and N CSI-RS(s) having a relatively large RSRP and K second CSI report(s) having a relatively small RSRP in each CSI-RS subset of the second CSI-RS group ("group 1"), the BS may provide configuration information including the values of M, N, and K to the UE. The example of FIG. 10 illustrates a case in which M=1, N=1, and K=1 are set. The BS may provide the configuration information to the UE, receive, from the UE, index information about a best transmission beam having transmitted CSI-RS #2 1010 having a large RSRP in the first CSI-RS group ("group 0") through the first CSI report 1010, receive index information about a best transmission beam for each CSI-RS subset having transmitted CSI-RS #7 and CSI-RS #9 having a large RSRP in the CSI-RS subset 0 and CSI-RS subset 1, respectively, of the second CSI-RS group ("group 1"), through the second CSI report 1020, and receive index information about a worst transmission beam for each CSI-RS subset having transmitted CSI-RS #5 and CSI-RS #11 having a small RSRP in CSI-RS subset 0 and CSI-RS subset 1, respectively, of the second CSI-RS group ("group 1"), through the second CSI report 1030. In FIG. 10, the second CSI reports 1020 and 1030 may include information about a best transmission beam and a worst transmission beam for each CSI-RS subset of the second CSI-RS group ("group 1").

Figure 11:
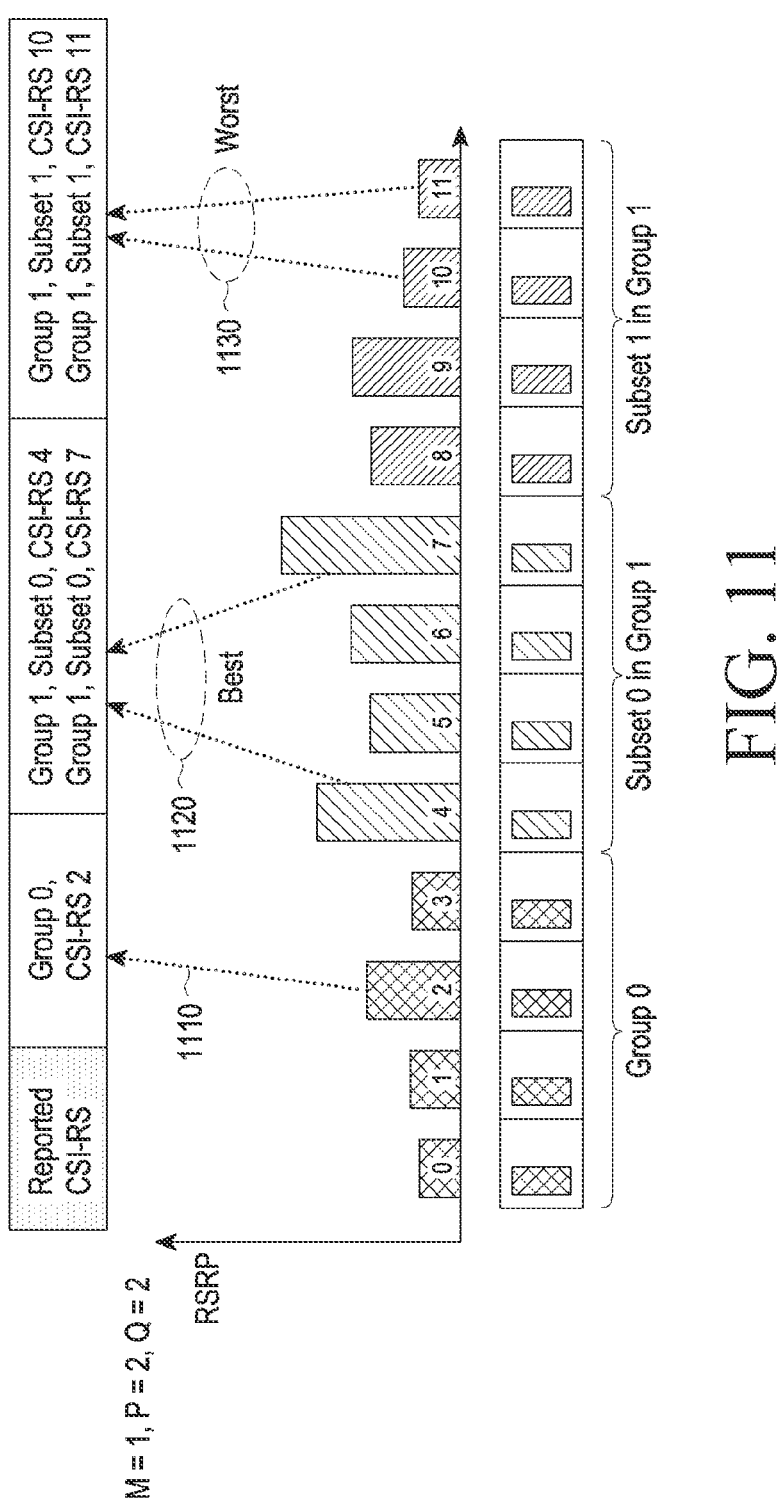
FIG. 11 illustrates a method for a CSI report for each CSI-RS group in a wireless communication system supporting an RIS according to an embodiment.

FIG. 11 illustrates a method for a CSI report for each CSI-RS group in a wireless communication system supporting an RIS according to an embodiment. FIG. 11 illustrates a configuration method for CSI reporting for each CSI-RS group.

In FIG. 11, the BS may configure a first CSI-RS group ("group 0") including first CSI-RSs (CSI-RS #0 to CSI-RS #3) for reporting the above-described first CSI and a second CSI-RS group ("group 1") including second CSI-RSs (CSI-RS #4 to CSI-RS #11) for reporting the above-described second CSI. In FIG. 11, it is assumed that the second CSI-RS group ("group 1") includes a first CSI-RS subset ("subset 0") including CSI-RS #4 to CSI-RS #7 and a second CSI-RS subset ("subset 1") including CSI-RS #8 to CSI-RS #11.

If the BS configures the first CSI report for M CSI-RS(s) having a relatively high RSRP in the first CSI-RS group ("group 0") and P CSI-RS(s) having a relatively high RSRP and Q second CSI report(s) having a relatively low RSRP in the second CSI-RS group ("group 1"), the BS may provide configuration information including the values of M, P, and Q to the UE. The example of FIG. 11 illustrates when M=1, P=2, and Q=2 are set. The BS may provide the configuration information to the UE, receive, from the UE, index information about a best transmission beam having transmitted CSI-RS #2 1010 having a high RSRP in the first CSI-RS group ("group 0") through the first CSI report 1110, receive index information about two best transmission beams having transmitted CSI-RS #4 and CSI-RS #7 having a relatively high RSRP in the second CSI-RS group ("group 1"), through the second CSI report 1120, and receive index information about two worst transmission beams having transmitted CSI-RS #10 and CSI-RS #11 having a relatively low RSRP in the second CSI-RS group ("group 1"), through the second CSI report 1130. In FIG. 11, the second CSI reports 1120 and 1130 may include information about two best transmission beams and two worst transmission beams for the second CSI-RS group ("group 1").

As described above, the BS may configure configuration information for UE CSI reporting in various forms for each CSI-RS group (or for each subset in the CSI-RS group).

Alternatively, the BS may configure and provide a worst case CSI report indicator for CSI report to the UE. When the worst case CSI report indicator is included in the configuration information for the CSI report, the UE may identify the number of the pieces of worst transmission beam information included in the CSI report, based on a value in the worst case CSI report indicator. For example, when the worst case CSI report indicator=V (where V>0), the UE may include V pieces of worst transmission beam information having a relatively low RSRP for each CSI-RS group (or for each subset in the CSI-RS group) in the CSI report and transmit the same to the BS. When worst case CSI report indicator=0, the UE does not include worst transmission beam information in the CSI report.

As described above, the BS may set a different CSI-RS transmission period for each CSI-RS group and provide configuration information including the CSI-RS transmission period to the UE. In this case, the CSI-RS transmission period may include a parameter $T_r$ indicating a period for each CSI-RS group. For example, the parameter $T_r$ may be set in slot units, and when the parameter $T_r$ value is set to "0", the CSI-RS transmission period for each CSI-RS group may be set aperiodically.

Alternatively, the best CSI report for the best transmission beam and the worst CSI report for the worst transmission beam may be individually set. In this case, the parameter $T_b$ indicating the best case CSI reporting period and the parameter $T_w$ indicating the worst case CSI reporting period may be included in the configuration information provided to the UE. In this case, when the parameter $T_b$ greater than 0 is set for the first CSI-RS group "group 0", the UE may perform best case CSI reporting in the $T_b$ period. When the parameter $T_w$ greater than 0 is set for the second CSI-RS group "group 1", the UE may perform worst case CSI reporting in the $T_w$ period. When the parameter $T_w$ is set to 0, the worst case CSI reporting by the UE may be performed aperiodically by control information such as DCI.

Figure 12:
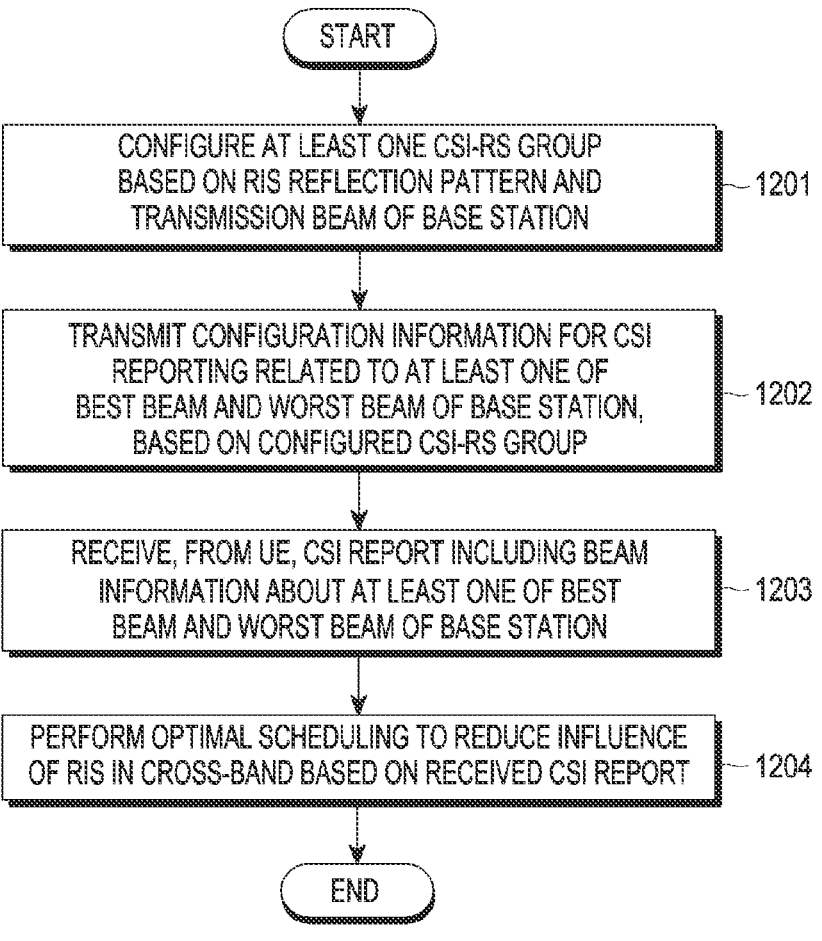
FIG. 12 is a flowchart illustrating a method performed by a BS in a wireless communication system supporting an RIS according to an embodiment.

FIG. 12 is a flowchart illustrating a method performed by a BS in a wireless communication system supporting an RIS according to an embodiment.

Referring to FIG. 12, in step 1201, the BS may configure at least one CSI-RS group based on at least one of the RIS reflection pattern and the transmission beam (beamforming vector of the transmission beam) of the BS. In step 1202, the BS may transmit, to the UE, configuration information for CSI reporting of the UE related to at least one of the best beam and the worst beam for transmitting the CSI-RS by the BS, based on the configured CSI-RS group. In step 1203, the BS may receive, from the UE receiving the configuration information, a CSI report including beam information (e.g., index information about the corresponding transmission beam) about at least one of the best beam and the worst beam through which the BS transmits the CSI-RS. In step 1204, the BS may perform optimal scheduling to reduce the influence of cross-band broadband reflections due to the reflection characteristics of the RIS device, based on the CSI report received from the corresponding UE.

Figure 13:
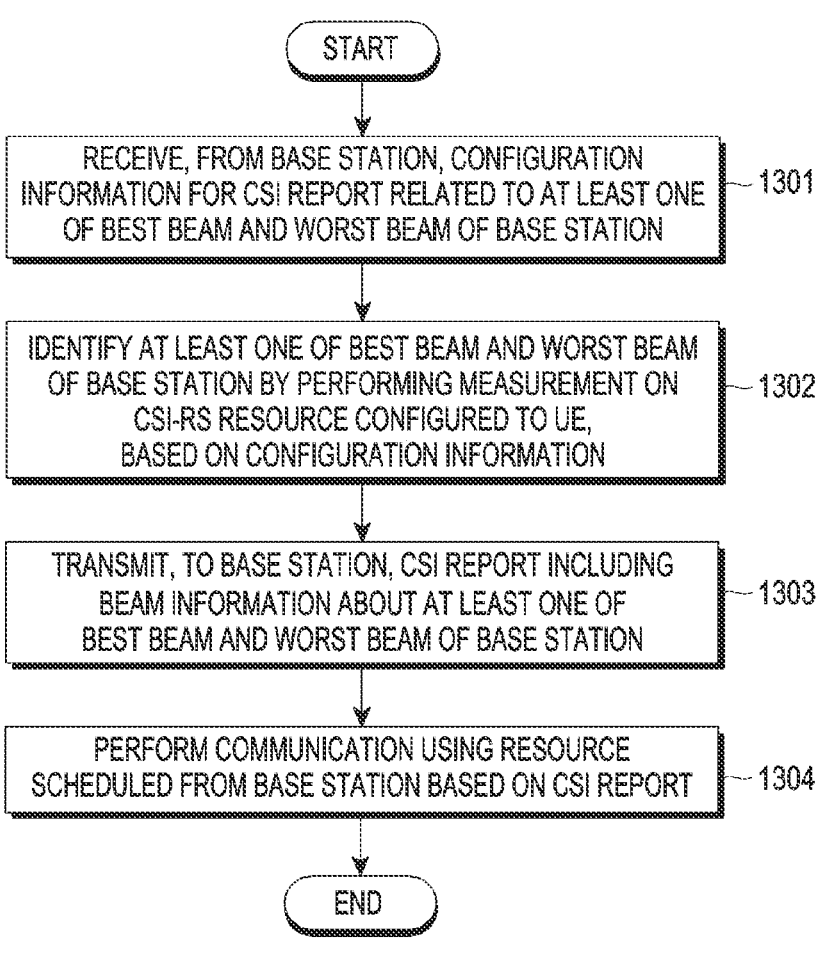
FIG. 13 is a flowchart illustrating a method performed by a UE in a wireless communication system supporting an RIS according to an embodiment.

FIG. 13 is a flowchart illustrating a method performed by a UE in a wireless communication system supporting an RIS according to an embodiment.

Referring to FIG. 13, in step 1301, the UE may receive configuration information for a CSI report including beam information (e.g., index information about the corresponding transmission beam) related to at least one of the best beam and the worst beam through which the BS transmits the CSI-RS to the UE, from the BS through the above-described higher layer signaling. In step 1302, the UE may identify at least one of the best beam and the worst beam through which the BS transmits the CSI-RS by performing RSRP measurement on the CSI-RS resource configured to the UE, based on the received configuration information. In step 1303, the UE may transmit a CSI report including the beam information about at least one of the best beam and the worst beam of the BS to the BS. The CSI reporting may be performed for each CSI-RS group (or for each subset in the CSI-RS group) as described above. In step 1304, the UE may perform communication using a resource scheduled from the BS based on the CSI report.

Figure 14:
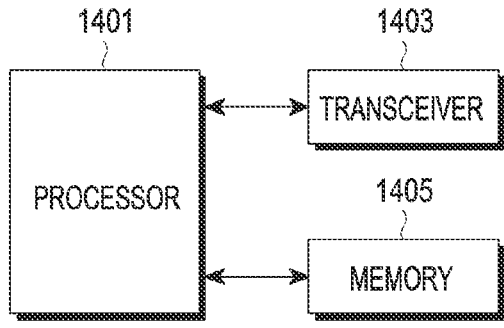
FIG. 14 illustrates a configuration of a network entity in a wireless communication system supporting an RIS according to an embodiment.

FIG. 14 illustrates a configuration of a network entity in a wireless communication system supporting an RIS according to an embodiment. The configuration of FIG. 14 may correspond to one of the BS, the UE, and the RIS device described in reference to FIGS. 1 to 13.

The network entity of FIG. 14 may include a processor 1401, a transceiver 1403, and memory 1405. The processor 1401, transceiver 1403, and memory 1405 of the network entity may be operated according to the communication methods of the network entity described above in connection with FIGS. 1 to 13. However, the components of the network entity are not limited thereto. For example, the network entity may include more or fewer components than the above-described components. The processor 1401, the transceiver 1403, and the memory 1405 may be implemented in the form of a single chip. The transceiver 1403 collectively refers to the receiver of the network entity and the transmitter of the network entity and may transmit and receive signals to/from a UE or another network entity. The transmitted/received signals may include at least one of control information and data. To that end, the transceiver 1403 may include a wired/wireless transceiver and may include various components for transmitting/receiving signals. The transceiver 1403 may receive signals, output the signals to the processor 1401, transmit the signals output from the processor 1401, receive the communication signal and output the communication signal to the processor 1401 and transmit the signal output from the processor 1401 to another network entity through the network. The memory 1405 may store programs and data necessary for the operation of the network entity according to at least one of the embodiments of FIGS. 1 to 13. The memory 1405 may store control information or data that is included in the signal obtained by the network entity. The memory 1405 may include a storage medium, such as a read only memory (ROM), a random access memory (RAM), hard disk, CD-ROM, and digital versatile disc (DVD), or a combination of storage media. The processor 1401 may control a series of processes so that the network entity may operate according to at least one of the embodiments of FIGS. 1 to 13.

The methods according to the embodiments described herein may be implemented in hardware, software, or a combination of hardware and software.

When implemented in software, there may be provided a computer readable storage medium storing one or more programs (software modules). One or more programs stored in the computer readable storage medium are configured to be executed by one or more processors in an electronic device. One or more programs include instructions that enable the electronic device to execute methods according to the embodiments described herein.

The programs (software modules or software) may be stored in RAMs, non-volatile memories including flash memories, ROMs, electrically erasable programmable read-only memories (EEPROMs), magnetic disc storage devices, compact-disc ROMs, DVDs), or other types of optical storage devices, or magnetic cassettes. Alternatively, the programs may be stored in memory constituted of a combination of all or some thereof. Multiple memories may be included.

The programs may be stored in attachable storage devices that may be accessed via a communication network, such as the Internet, Intranet, local area network (LAN), wide area network (WLAN), or storage area network (SAN) or a communication network configured of a combination thereof. The storage device may connect to the device that performs embodiments of the disclosure via an external port. A separate storage device over the communication network may be connected to the device that performs embodiments of the disclosure.

It should be appreciated that the blocks in each flowchart and combinations of the flowcharts herein may be performed by computer program instructions.

Each block may represent a module, segment, or part of a code including one or more executable instructions for executing a specified logical function(s). In some replacement embodiments, the functions mentioned in the blocks may occur in different orders. For example, two blocks that are consecutively shown may be performed substantially simultaneously or in a reverse order depending on corresponding functions.

While the disclosure has been illustrated and described with reference to various embodiments of the present disclosure, those skilled in the art will understand that various changes can be made in form and detail without departing from the spirit and scope of the present disclosure as defined by the appended claims and their equivalents.

What is claimed is:

1. A method performed by a base station (BS) in a wireless communication system supporting a reconfigurable intelligent surface (RIS), the method comprising:

configuring a first channel state information-reference signal (CSI-RS) set and a second CSI-RS set, based on at least one of an RIS reflection pattern to be applied to an RIS device or a transmission beam of the BS;

transmitting, to a user equipment (UE), configuration information for a channel state information (CSI) report related to at least one transmission beam and for the BS to transmit CSI-RSs to the UE based on the first CSI-RS set and the second CSI-RS set;

transmitting, to the UE, the CSI-RSs for the first CSI-RS set and the second CSI-RS set based on the configuration information; and receiving, from the UE, a first CSI report corresponding to the first CSI-RS set and a second CSI report corresponding to the second CSI-RS set, related to the at least one transmission beam, wherein the first CSI-RS set includes first CSI-RSs for the first CSI report excluding a cross-band broadband reflection influence by the RIS device, and wherein the second CSI-RS set includes second CSI-RSs for the second CSI report considering the cross-band broadband reflection influence by the RIS device.

2. The method of claim 1, wherein the at least one transmission beam includes one or more transmission beams of at least one best transmission beam having a relatively high reference signal received power (RSRP) of the CSI-RS or at least one worst transmission beam having a relatively low RSRP of the CSI-RS.

3. The method of claim 1, further comprising:

controlling, the RIS device to be turned off when transmitting the first CSI-RSs belonging to the first CSI-RS set; and controlling the RIS device to be turned on when transmitting the second CSI-RSs belonging to the second CSI-RS set.

4. The method of claim 1, wherein the first CSI-RSs of the first CSI-RS set are transmitted by applying a beamforming vector of a corresponding transmission beam, and wherein the second CSI-RSs of the second CSI-RS set are transmitted by applying a combination of an RIS reflection pattern and a beamforming vector of a corresponding transmission beam.

5. The method of claim 4, wherein the second CSI-RS set includes a plurality of CSI-RS subsets, wherein the same RIS reflection pattern is applied to CSI-RSs in each of the plurality of CSI-RS subsets, and wherein a different RIS reflection pattern is applied between different CSI-RS subsets.

6. The method of claim 4, wherein the second CSI-RS set includes a plurality of CSI-RS subsets, wherein the same beamforming vector is applied to CSI-RSs in each of the plurality of CSI-RS subsets, and wherein a different beamforming vector is applied between different CSI-RS subsets.

7. The method of claim 1, wherein a first transmission period of the first CSI-RSs of the first CSI-RS set is set to be different from a second transmission period of the second CSI-RSs of the second CSI-RS set.

8. A base station (BS) in a wireless communication system supporting a reconfigurable intelligent surface (RIS), the BS comprising:

a transceiver; and a processor coupled to the transceiver, and configured to:

configure a first channel state information-reference signal (CSI-RS) set and a second CSI-RS set, based on at least one of an RIS reflection pattern to be applied to an RIS device or a transmission beam of the BS;

transmit, to a user equipment (UE), configuration information for a channel state information (CSI) report related to at least one transmission beam and for the BS to transmit CSI-RSs to the UE based on the first CSI-RS set and the second CSI-RS set;

transmit, to the UE, the CSI-RSs for the first CSI-RS set and the second CSI-RS set based on the configuration information; and receive, from the UE, a first CSI report corresponding to the first CSI-RS set and a second CSI report corresponding to the second CSI-RS set, related to the at least one transmission beam, wherein the first CSI-RS set includes first CSI-RSs for the first CSI report excluding a cross-band broadband reflection influence by the RIS device, and wherein the second CSI-RS set includes second CSI-RSs for the second CSI report considering the cross-band broadband reflection influence by the RIS device.

9. The BS of claim 7, wherein the at least one transmission beam includes beam information about one or more transmission beams of at least one best transmission beam having a relatively high reference signal received power (RSRP) of the CSI-RS or at least one worst transmission beam having a relatively low RSRP of the CSI-RS.

10. The BS of claim 8, wherein the processor is further configured to control, by the BS, the RIS device to be turned off when transmitting the first CSI-RSs belonging to the first CSI-RS set and control the RIS device to be turned on when transmitting the second CSI-RSs belonging to the second CSI-RS set.

11. The BS of claim 8, wherein the processor is configured to transmit the first CSI-RSs of the first CSI-RS set by applying a beamforming vector of a corresponding transmission beam and transmit the second CSI-RSs of the second CSI-RS set by applying a combination of an RIS reflection pattern and a beamforming vector of a corresponding transmission beam.

12. The BS of claim 11, wherein the second CSI-RS set includes a plurality of CSI-RS subsets, wherein the same RIS reflection pattern is applied to CSI-RSs in each of the plurality of CSI-RS subsets, and wherein a different RIS reflection pattern is applied between different CSI-RS subsets.

13. The BS of claim 11, wherein the second CSI-RS set includes a plurality of CSI-RS subsets, wherein the same beamforming vector is applied to CSI-RSs in each of the plurality of CSI-RS subsets, and wherein a different beamforming vector is applied between different CSI-RS subsets.

14. The BS of claim 8, wherein a first transmission period of the first CSI-RSs of the first CSI-RS set is set to be different from a second transmission period of the second CSI-RSs of the second CSI-RS set.

15. A method performed by a user equipment (UE) in a wireless communication system supporting a reconfigurable intelligent surface (RIS), the method comprising:

receiving, from a base station (BS), configuration information for a channel state information (CSI) report related to at least one transmission beam and for the BS to transmit, to the UE, channel state information-reference signals (CSI-RSs) for a first CSI-RS set and a second CSI-RS set;

receiving, from the BS, the CSI-RSs for the first CSI-RS set and the second CSI-RS set based on the configuration information;

measuring a received signal strength; and transmitting, to the BS, a first CSI report corresponding to the first CSI-RS set and a second CSI report corresponding to the second CSI-RS set, including beam information related to the at least one transmission beam based on the configuration information and the received signal strength, wherein the first CSI-RS set includes first CSI-RSs for the first CSI report excluding a cross-band broadband reflection influence by an RIS device, and wherein the second CSI-RS set includes second CSI-RSs for the second CSI report considering the cross-band broadband reflection influence by the RIS device.

16. The method of claim 15, wherein the CSI report includes beam index information for one or more transmission beams of at least one best transmission beam having a relatively high RSRP of the CSI-RS or at least one worst transmission beam having a relatively low RSRP of the CSI-RS.

17. A user equipment (UE) in a wireless communication system supporting a reconfigurable intelligent surface (RIS), the UE comprising:

a transceiver; and a processor coupled to the transceiver, and configured to:

receive, from a base station (BS), configuration information for a channel state information (CSI) report related to at least one transmission beam and for the BS to transmit, to the UE, channel state information-reference signals (CSI-RSs) for a first CSI-RS set and a second CSI-RS set;

receive, from the BS, the CSI-RSs for the first CSI-RS set and the second CSI-RS set based on the configuration information;

measure a received signal strength; and transmit, to the BS, a first CSI report corresponding to the first CSI-RS set and a second CSI report corresponding to the second CSI-RS set, including beam information related to the at least one transmission beam based on the configuration information and the received signal strength, wherein the first CSI-RS set includes first CSI-RSs for the first CSI report excluding a cross-band broadband reflection influence by an RIS device, and wherein the second CSI-RS set includes second CSI-RSs for the second CSI report considering the cross-band broadband reflection influence by the RIS device.

18. The UE of claim 17, wherein the CSI report includes beam index information for one or more transmission beams of at least one best transmission beam having a relatively high reference signal received power (RSRP) of the CSI-RS or at least one worst transmission beam having a relatively low RSRP of the CSI-RS.

* * * * *